United States Patent
Moon et al.

(10) Patent No.: US 11,341,416 B1
(45) Date of Patent: May 24, 2022

(54) BIT-LEVEL LEARNING FOR WORD-LEVEL CONSTRAINT SOLVING

(71) Applicant: Synopsys, Inc., Mountain View, CA (US)

(72) Inventors: In-Ho Moon, Portland, OR (US); Qiang Qiang, Santa Clara, CA (US)

(73) Assignee: Synopsys, Inc., Mountain View, CA (US)

( * ) Notice: Subject to any disclaimer, the term of this patent is extended or adjusted under 35 U.S.C. 154(b) by 638 days.

(21) Appl. No.: 16/219,706

(22) Filed: Dec. 13, 2018

Related U.S. Application Data

(60) Provisional application No. 62/599,040, filed on Dec. 15, 2017.

(51) Int. Cl.
| | | |
|---|---|---|
| *G06N 5/00* | (2006.01) | |
| *G06F 17/17* | (2006.01) | |
| *G06F 30/327* | (2020.01) | |
| *G06F 111/04* | (2020.01) | |

(52) U.S. Cl.
CPC ............ *G06N 5/006* (2013.01); *G06F 17/17* (2013.01); *G06F 30/327* (2020.01); *G06F 2111/04* (2020.01)

(58) Field of Classification Search
None
See application file for complete search history.

(56) References Cited

U.S. PATENT DOCUMENTS

| | | | |
|---|---|---|---|
| 6,449,745 B1 * | 9/2002 | Kim ................. | G01R 31/31813 714/728 |
| 7,992,113 B1 * | 8/2011 | Goldberg ............ | G06F 30/3323 716/106 |
| 8,156,462 B2 * | 4/2012 | Moon ................. | G06F 30/3323 716/111 |
| 8,914,758 B1 | 12/2014 | Kundu et al. | |
| 9,489,477 B2 | 11/2016 | Bjesse | |
| 2003/0046673 A1 * | 3/2003 | Copeland ............ | G06F 9/44521 717/163 |

(Continued)

OTHER PUBLICATIONS

Carl Pixley, "Constraint-Based Verification", 2001 Synopsys, Inc., https://pdfs.semanticscholar.org/eb3a/278ed4f700ff575a407359aec660a8e5eea9.pdf, downloaded Mar. 13, 2019.

(Continued)

*Primary Examiner* — Kamini S Shah
*Assistant Examiner* — Russ Guill
(74) *Attorney, Agent, or Firm* — Park, Vaughan, Fleming & Dowler LLP; Laxman Sahasrabuddhe

(57) ABSTRACT

Techniques and systems for solving a set of constraints are described. Binary decision diagram (BDD) learning can be applied to a proper subset of the first set of constraints to obtain a set of bit-level invariants. The set of bit-level invariants can then be used for solving the set of constraints. The set of bit-level invariants can include (1) forbidden invariants, (2) conditional invariants, and/or (3) bit-level invariants that are determined by applying BDD learning to a conjunction of constraints and range expressions. If multiple implied constraints have a common right-hand-side (RHS) expression, then BDD learning can be applied to the common RHS expression only once.

17 Claims, 5 Drawing Sheets

(56) References Cited

U.S. PATENT DOCUMENTS

2012/0278675 A1* 11/2012 Qiang .................... G06F 30/39
714/739
2015/0040107 A1* 2/2015 Iyer ...................... G06F 30/327
717/131

OTHER PUBLICATIONS

Constantinos Bartzis et al., "Construction of efficient BDDs for Bounded Arithmetic Constraints", http://www.cs.cmu.edu/~cbartzis/papers/paper135.pdf, downloaded Mar. 13, 2019.
Robert Wille et al., "Sword: A SAT like Prover Using Word Level Information", https://link.springer.com/content/pdf/10.1007/978-0-387-89558-1_10.pdf, downloaded Mar. 13, 2019.
Yen-Sheng Ho et al., "Efficient Uninterpreted Function Abstraction and Refinement for Word-level Model Checking", http://www.cs.utexas.edu/users/hunt/FMCAD/FMCAD16/slides/s6t2.pdf, downloaded Mar. 13, 2019.
Zhihong Zeng et al., "Functional Test Generation using Constraint Logic Programming", http://citeseerx.ist.psu.edu/viewdoc/download?doi=10.1.1.94.5127&rep=rep1&type=pdf, downloaded Mar. 13, 2019.

* cited by examiner $$C(a,b,c) = \overline{a} \cdot b \cdot c + a \cdot \overline{b} \cdot c + a \cdot b \cdot \overline{c}$$

BIT-LEVEL LEARNING FOR WORD-LEVEL CONSTRAINT SOLVING

RELATED APPLICATION

This application claims benefit of U.S. Provisional Application Ser. No. 62/599,040, filed on 15 Dec. 2017, the contents of which are herein incorporated by reference in their entirety for all purposes.

BACKGROUND

Technical Field

This disclosure relates to constraint solving. More specifically, this disclosure relates to bit-level learning for word-level constraint solving.

Related Art

Advances in process technology and an almost unlimited appetite for electronics have fueled a rapid increase in the size and complexity of integrated circuit (IC) designs. The importance of verification cannot be overstated. Indeed, without verification it would have been impossible to design complicated integrated circuits which are commonly found in today's computing devices. A constraint solver is an important tool that is used during verification. A constraint solver solves the following constraint satisfaction problem: given a set of constraints that are defined over a set of variables, assign a set of values to the set of variables that satisfy the set of constraints.

Word-level constraint solvers create a word-level circuit model to represent the constraints. The word-level circuit model uses a word-level value system to represent possible values for all nodes in the model. This word-level value system may use intervals and ranges to represent multiple values in a compact form. For example, let "a" be a 4 bit unsigned variable. Independent of the constraints on "a," we can say that the possible values that "a" can have are {0:15}, i.e., from 0 to 15. Note that this compactly represents multiple values, without explicitly enumerating all the values. This representation can be referred to as an interval.

Suppose the constraint "a !=7" is imposed on variable "a." This constraint restricts the values "a" can have to {0:6}, {8:15}. Such a "list of intervals" can be referred to as a range. If another constraint, "a>2," is added, the range value that variable "a" can take is further restricted to {3:6}, {8:15}. A constraint problem that is based on these constraints can be stated as follows: determine random values for variable "a," such that all the constraints on variable "a" are satisfied. The above-described constraint problem can be represented by the following lines of code:

rand bit[3:0] a;
constraint cons1 {
  a !=7;
  a>2;
}

FIG. 1 illustrates a word-level circuit for a constraint problem. The word-level circuit in FIG. 1 includes nodes 102, 104, and 106. Node 102 can correspond to conjunction of the set of constraints, node 104 can correspond to constraint "a !=7," and node 106 can correspond to constraint "a>2." The "&&" operator shown inside node 102 indicates that both constraints need to be satisfied.

After creating the word-level circuit model, a word-level constraint solver can perform static implications to refine the range values on each node in the circuit. The result of performing static implications is also shown in FIG. 1. The range value shown next to each node in the circuit is the result of performing static implications. After performing static implications, the word-level constraint solver can perform static learning to further refine the range values. Then the word-level constraint solver can pick and try values for the unassigned random variables.

For example, in the word-level circuit illustrated in FIG. 1, suppose the constraint solver picks a random value "5" for variable "a." Once this value is picked, the word-level constraint solver can invoke its implication engine to incrementally update the range values in the circuit and to determine if this value assignment to variable "a" results in any conflicts. For the value "5," the implication engine will evaluate the "!=" comparator node and the ">" comparator node to determine that there is no conflict. Therefore, the assignment "a=5" is determined as a legal random assignment that satisfies all the constraints. Note that a word-level constraint solver can remember the evaluation result generated by a node, and reuse the evaluation result if the input values to the node have not changed.

If a conflict is encountered during the implication process, the word-level constraint solver can backtrack on the last assigned variable and try other value assignment until the word-level constraint solver determines an assignment that does not result in any conflicts (if such a solution exists). Due to backtracking, the word-level constraint solver may need to invoke its implication engine repeatedly, which can end up consuming a majority of the word-level constraint solver's computation time.

The set of constraints can alternatively be represented at the bit-level by using a binary decision diagram (BDD). The BDD representation can then be used by a bit-level constraint solver to determine solutions to the set of constraints. Specifically, each path in the BDD from the root node to the terminal node that corresponds to the value "1" can be associated with a value assignment that satisfies the set of constraints.

FIG. 2A illustrates a constraint. The constraint illustrated in FIG. 2A is a Boolean function over three variables: "a," "b," and "c." The variables may model signals in a design under verification (DUV), e.g., the variable "a" may be a random variable that represents the logic state of an input signal in the DUV. Variable "b" may be a state variable that represents the output of a logic gate in the DUV.

FIG. 2B illustrates a BDD. BDD 200 represents the constraint shown in FIG. 2A. BDD 200 includes nodes 202, 204, 206, 208, 210, 212, 214, and 216. Node 202 is the root node which represents the entire constraint. Node 204 can be associated with variable "a," nodes 206 and 208 can be associated with variable "b," and nodes 210 and 212 can be associated with variable "c." Node 214 can represent the Boolean value "TRUE" or "1" for the Boolean function. In other words, node 214 can represent a situation in which the constraint has been satisfied. In contrast, node 216 can represent the Boolean value "FALSE" or "0." In other words, node 216 can represent a situation in which the constraint has not been satisfied.

The directed edges in BDD 200 can represent a value assignment to a variable. For example, the directed edge between nodes 204 and 206 can be associated with assigning value "0" to the random variable "a." Similarly, the directed edge between nodes 208 and 212 can be associated with assigning value "1" to the state variable "b."

A directed path in a BDD from the root node, e.g., node 202, to the terminal node for the Boolean value "TRUE,"

e.g., node 214, corresponds to a value assignment to the variables that satisfies the set of constraints which is being represented by the BDD, e.g., the constraint shown in FIG. 2A. For example, path 218 begins at node 202 and terminates at node 214. The value assignments associated with path 218 are: a=0, b=1, and c=1. It will be evident that this value assignment causes the Boolean function shown in FIG. 2A to evaluate to "TRUE." Once a bit-level constraint solver builds the BDD, it can generate solutions to the set of constraints by determining all distinct paths from the root node to the terminal node associated with the "TRUE" value.

In general, word-level representations are significantly more compact than bit-level representations. As a result, word-level constraint solvers are often used for solving a set of constraints. Nonetheless, existing word-level constraint solvers can have poor performance. Specifically, existing word-level constraint solvers can time out depending on the set of constraints, i.e., existing word-level constraint solvers may not be unable to solve a particular set of constraints within a reasonable amount of time. Therefore, what are needed are techniques and systems for improving the performance of word-level constraint solvers.

SUMMARY

Some embodiments described herein provide techniques and systems for using a word-level solver to solve a set of constraints. During operation, an embodiment can identify a proper subset of a first set of constraints. Next, the embodiment can determine a set of bit-level invariants by applying BDD learning to the proper subset of the first set of constraints. The embodiment can then add the set of bit-level invariants to the first set of constraints to obtain a second set of constraints. Next, the embodiment can solve the second set of constraints by using a word-level constraint solver. Each constraint in the first set of constraints and the second set of constraints can be an expression that is defined over a set of variables used in a description of an IC design. Solving the second set of constraints can comprise determining value assignments that satisfy a conjunction of the first set of constraints and the set of bit-level invariants.

In some embodiments, the set of bit-level invariants includes at least one forbidden invariant. In some embodiments, the set of bit-level invariants includes at least one conditional invariant.

If multiple implied constraints have a common right-hand-side (RHS) expression, then BDD learning can be applied to the common RHS expression only once, and the resulting bit-level invariants can be used for all of the multiple implied constraints. (This is in contrast to applying BDD learning to the RHS of each individual implied constraint.)

Some embodiments can determine bit-level invariants by (1) determining a first set of bit-level invariants by applying BDD learning to a set of range expressions, (2) determining a second set of bit-level invariants by applying BDD learning to a conjunction of a set of constraints and the set of range expressions, and (3) removing bit-level invariants from the second set of bit-level invariants that appear in the first set of bit-level invariants. The bit-level invariants that remain in the second set of bit-level invariants can then be used to solve the set of constraints.

DETAILED DESCRIPTION

Figures 1, 2A:
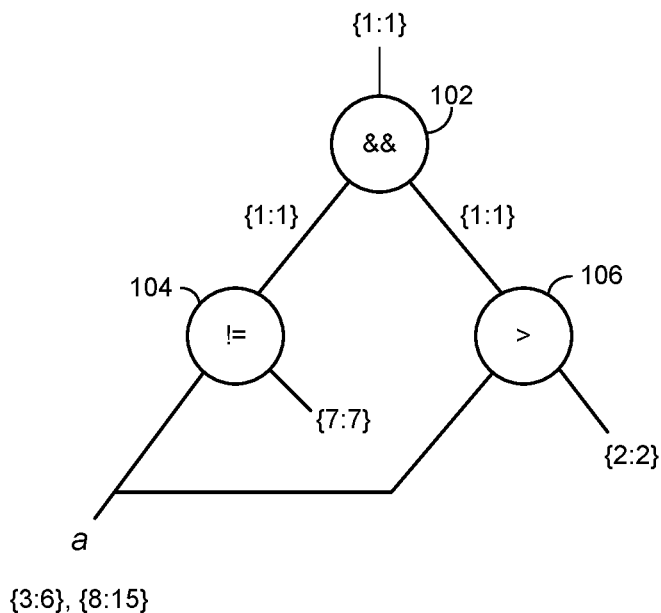
FIG. 1 illustrates a word-level circuit for a constraint problem.
FIG. 2A illustrates a constraint.
Figure 2B:
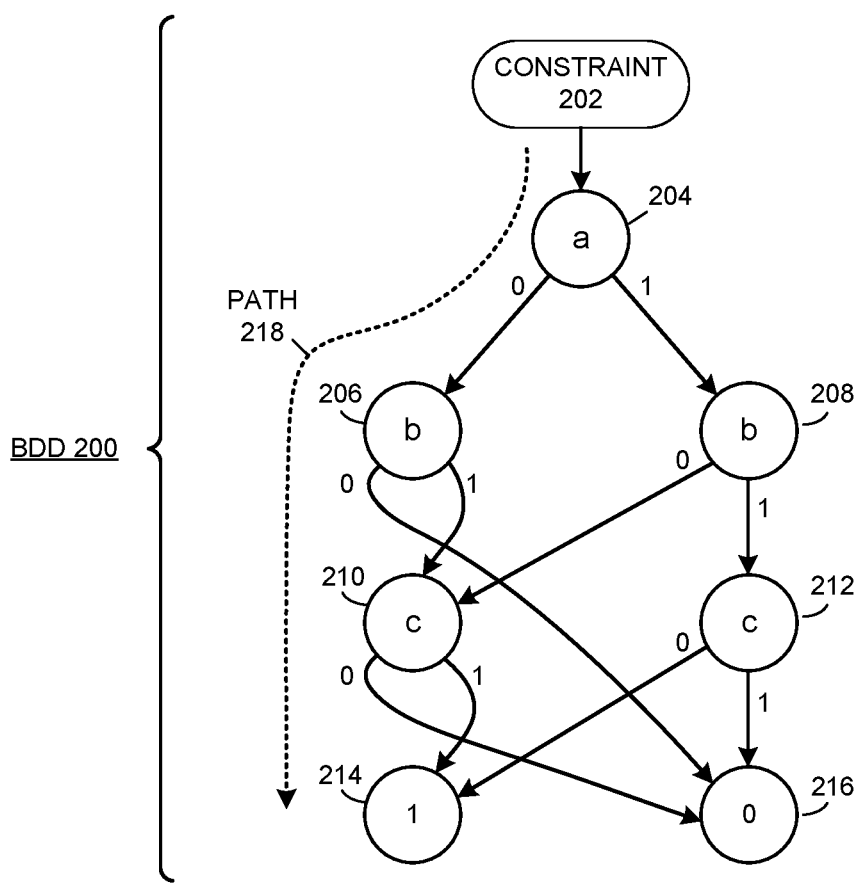
FIG. 2B illustrates a BDD.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Overview of IC Design and Manufacturing

An IC design and manufacturing process produces IC chips. IC design software tools can be used to create an IC design. Once the IC design is finalized, it can undergo fabrication, packaging, and assembly to produce IC chips. The overall IC design and manufacturing process can involve multiple entities, e.g., one company may create the software for designing ICs, another company may use the software to create the IC design, and yet another company may manufacture IC chips based on the IC design. An IC design flow can include multiple steps, and each step can involve using one or more IC design software tools. An improvement to one or more of these steps in the IC design flow results in an improvement to the overall IC design and manufacturing process. Specifically, the improved IC design and manufacturing process can produce IC chips with a shorter time-to-market (TTM) and/or higher quality of results (QoR).

An IC design can be represented by using different data formats or languages as the IC design progresses through an IC design flow, wherein the different data formats or languages represent the IC design at different levels of abstraction. In general, higher levels of abstraction contain fewer details of the IC design than lower levels of abstraction. Typically, the IC design is described at a high level of abstraction in the early stages of the IC design flow, and the level of abstraction becomes progressively lower as the IC design moves through the IC design flow (the description of the IC design becomes more specific as the IC design progresses through the IC design flow).

For example, toward the beginning of the IC design flow, an IC design can be described at a high level of abstraction by using a hardware description language (HDL) which describes the functionality of the IC design but does not provide any information about the actual geometric shapes that will be printed on the wafer. Toward the end of the IC design flow, the same IC design can be represented in a low level of abstraction by using a data format or language such as GDSII or OASIS, which contains a description of the actual geometric shapes that are to be printed on the wafer. In between the two ends of the IC design flow, the IC design may be represented in numerous data formats or languages that describe the same IC design at different levels of abstraction.

Some examples of IC design steps and the associated software tools are described below. These examples are for illustrative purposes only and are not intended to limit the embodiments to the forms disclosed. This disclosure describes embodiments that can be used in one or more IC design steps.

IC design software tools enable IC designers to describe the functionality that the IC designers want to implement. These tools also enable IC designers to perform what-if planning to refine functionality, check costs, etc. During logic design and functional verification, the HDL, e.g., SystemVerilog, code can be written and the design can be checked for functional accuracy, e.g., the design can be checked to ensure that it produces the correct outputs.

During synthesis and design for test, the HDL code can be translated to a netlist using one or more IC design software tools. Further, the netlist can be optimized for the target technology, and tests can be designed and implemented to check the finished chips. During netlist verification, the netlist can be checked for compliance with timing constraints and for correspondence (i.e., equivalence checking) with the RTL design and/or HDL code.

During design planning, an overall floorplan for the chip can be constructed and analyzed for timing and top-level routing. During physical implementation, circuit elements can be positioned in the layout and can be electrically connected.

During analysis and extraction, the IC design's functionality can be verified at a transistor level and parasitics can be extracted. During physical verification, the design can be checked to ensure correctness for manufacturing, electrical issues, lithographic issues, and circuitry.

During resolution enhancement, geometric manipulations can be performed on the layout to improve manufacturability of the design. During mask data preparation, the design can be "taped-out" to produce masks which are used during fabrication.

Overview of Bit-Level Learning for Word-Level Constraint Solving

Constraints can be used to guide simulations to have only valid input values satisfying the constraints. As used herein, "conjoined constraint" or "conjunction of a set of constraints" signifies a conjunction of more than one constraint. For example, if a set of constraints includes two constraints, C1 and C2, then the "conjoined constraint" or the "conjunction of the set of constraints" CC=C1 && C2 is satisfied when both C1 and C2 are satisfied.

Bit-level operations often appear in word-level constraints, especially in arithmetic operations. For instance, consider the following constraint:
   constraint word {
     ((((x+15)^x) & 32'h1000) !=0);
   }
A word-level solver may have a hard time finding a value satisfying the above constraint because the word-level solver could require a lot of backtracking during the decision process. U.S. Pat. No. 8,156,462 describes a technique called "BDD learning" which can be used to derive invariants from constraints. The contents of U.S. Pat. No. 8,156,462 are herein incorporated by reference in their entirety for all purposes. The invariants that are derived by using BDD can then be added to the set of constraints, thereby improving the efficiency by which the word-level constraint solver finds solutions to the set of constraints. An invariant is just like a constraint, i.e., it is an expression that is defined over a set of variables. However, an invariant has the following property: if invariant I is derived from constraint C, then any value assignment that satisfies C also satisfies I. Note that the converse is not true, i.e., there could be some value assignments that satisfy I, but that do not satisfy C.

The above-mentioned word-level constraint can be efficiently solved by using the following bit-level invariant in addition to the original word-level constraint. Specifically, when the following bit-level invariants are added to the set of constraints, the word-level constraint solver can find a valid value easily, without performing any backtracking. The bit-level invariant is as follows:
   constraint bit {
     (x[11:4]==8'b11111111);
     (x[3:0] !=4'b0000);
   }
The bit-level invariant shown above can be obtained from the word-level constraints by means of BDD learning. This leaning process is fast, in the sense that the time taken for learning is minimal as compared to the whole time to solve the constraints. We call this learning as "BDD learning" since we use a BDD to perform the learning as explained in U.S. Pat. No. 8,156,462.

Another example of bit-level constraint or invariant learning can be illustrated by using the following example.
   rand bit[63:0] ta1_addr;
   rand bit[63:0] ta2_addr;
   constraint cons (
     (ta2_addr==(ta1_addr+16));
     (((((ta1_addr+16)−1) ^ta1_addr) & 32'h1000) !=0);
     (((((ta2_addr+16)−1) ^ta2_addr) & 32'h1000) !=0);
   }
In this example, a bit-level solver can find a conflict instantly. However, a word-level solver can have a hard time in finding the conflict. Here is an analysis on why there is a conflict. Based on the constraint
   (((x+15)^x) & 32'h1000) !=0,
we can find the solution x=24568 that satisfies the above constraint. Specifically,
x is 24568 (0101 1111 1111 1000)–value1
+15 becomes 24583 (0110 0000 0000 0111)–value2=value1+15
^ becomes 0011 1111 1111 1111–value3=value1^value3
32'h1000 0001 0000 0000 0000–value4
& becomes 0001 0000 0000 0000–value5=value3 & value4

Two necessary conditions can be derived to satisfy the constraint: (1) to make value5 non-zero, the 13th bit of value3 must be 1, and (2) the 13th bit of value1 must be toggled by adding 15. To satisfy these two necessary conditions, there are two properties required on x: (1) The 5th through 12th bits (a total of 8 bits) of x should have all 1's, and (2) The 1st through 4th bits (a total of 4 bits) of x should have at least one 1 (i.e., it shouldn't be 0000). Now, one such ta1_addr (such as 24568) can be found easily. But, since ta2_addr is (ta1_addr+16), ta2_addr can't satisfy Property 1. Specifically,
   24568 (0101 1111 1111 1000)—valid
   24584 (0110 0000 0000 1000)—invalid In this case, if we build a BDD for the constraint, some embodiments described herein compute the following invariants:

Invariant 1) x[11:4]==11111111
Invariant 2) x[3:0] !=0000

Some embodiments described herein provide techniques and systems for performing such BDD learning. In particular, here are some of the invariants that can be generated by some embodiments described in this disclosure for the above example.

===invariants for constraint id (1)===
CONSTANT var 0 [11:4] 11111111
FORBIDDEN var 0 [3:0] 0000
===invariants for constraint id (2)===
CONSTANT var 1 [11:4] 11111111
FORBIDDEN var 1 [3:0] 0000

These bit-level invariants can be obtained from a bit-level solver since a bit-level solver looks at all possible solution space, whereas the word-level solver cannot since it doesn't look at all solution space. In this manner, embodiments described herein can learn an invariant from a bit-level solver, and use it in a word-level solver.

Specifically, in some of the embodiments disclosed herein, the efficiency of a word-level constraint solver can be improved by means of the following techniques: 1) BDD Learning, 2) Use of Forbidden Invariant, 3) Conditional Learning and Conditional Invariant, 4) Handling Duplicate Constraints, and/or 5) Handling Variable Size with Initial Value Ranges. Each of these techniques is discussed in more detail below.

BDD Learning Based on Subsets of Constraints

The following documents provide details of BDD learning, and are herein incorporated by reference in their entirety for all purposes: (1) In-Ho Moon, "Verification Techniques Including Deriving Invariants from Constraints", U.S. Pat. No. 8,156,462, (2) In-Ho Moon and Kevin Harer, "Learning from Constraints for Formal Property Checking", International High Level Design Validation and Test Workshop (HLDVT), November 2009, and (3) In-Ho Moon and Kevin Harer, "Learning from Constraints for Formal Property Checking", Journal of Electronic Testing: Theory and Applications (JETTA), April 2010.

The basic idea behind BDD learning is to find common factors in all solutions. The above-mentioned documents provide the techniques for using BDD learning to determine the following types of invariants:

CONSTANT: (cons, var, value, high, low) var[high:low]==value (binary string)
SYMMETRY: (cons, var, bit1, bit2) var[bit1]==var[bit2]
NEGATION: (cons, var, bit1, bit2) var[bit1]!=var[bit2]
IMPLY: (cons, var, polarity, bit1, bit2) polarity: {PP, PN,NP,NN}
E.g.) NP: ~var[bit1]->var[bit2]
SYMMETRY2: (cons, var1, var2, bit1, bit2) var1[bit1]==var2[bit2]
NZGATION2: (cons, var1, var2, bit1, bit2) var1[bit1]!=var2[bit2]
IMPLY2: (cons, var1, var2, polarity, bit1, bit2) E.g.) NN: -var1[bit1]->-var2[bit2]
ONZEOT: (cons, var, bits[ ]) if bit[0] is -1, all bits
ONZEOT0: (cons, var, bits[ ]) ONEHOT or all zeros
EZROROT: (cons, var, bits[ ])
ZEROROT0: (cons, var, bits[ ])

In contrast to existing approaches, embodiments described in this disclosure apply the BDD learning technique to each constraint selectively, or to a subset of constraints selectively, instead of applying the BDD learning technique to the conjunction of all of the constraints. This approach—i.e., the approach of applying BDD learning to individual constraints or to a proper subset of constraints—is more efficient because it is expensive to apply BDD learning to the conjoined constraint (i.e., a logical "AND" of all constraints), even though it can give stronger invariants. In practice, we still get invariants good enough from each single constraint. Furthermore, we can apply BDD learning only on those constraints containing any bit-level operations.

To reiterate, a word-level constraint solver needs to determine variable assignments that satisfy all constraints in a set of constraints, i.e., the variable assignment must satisfy the logical "AND" of a set of constraints. Existing BDD learning approaches apply BDD learning on the conjoined constraint, i.e., the logical "AND" of the set of constraints. As explained above, this approach can result in stronger invariants, but it can be computationally expensive. Some embodiments described herein are based on the following non-obvious insight: if we apply BDD learning to individual constraints, or to a proper subset of constraints, then we can obtain invariants very efficiently, without sacrificing too much on the strength of the invariants. In other words, the invariants may not be the strongest possible invariants, but they are sufficiently strong to substantially speed up the word-level constraint solving process.

Figure 3:
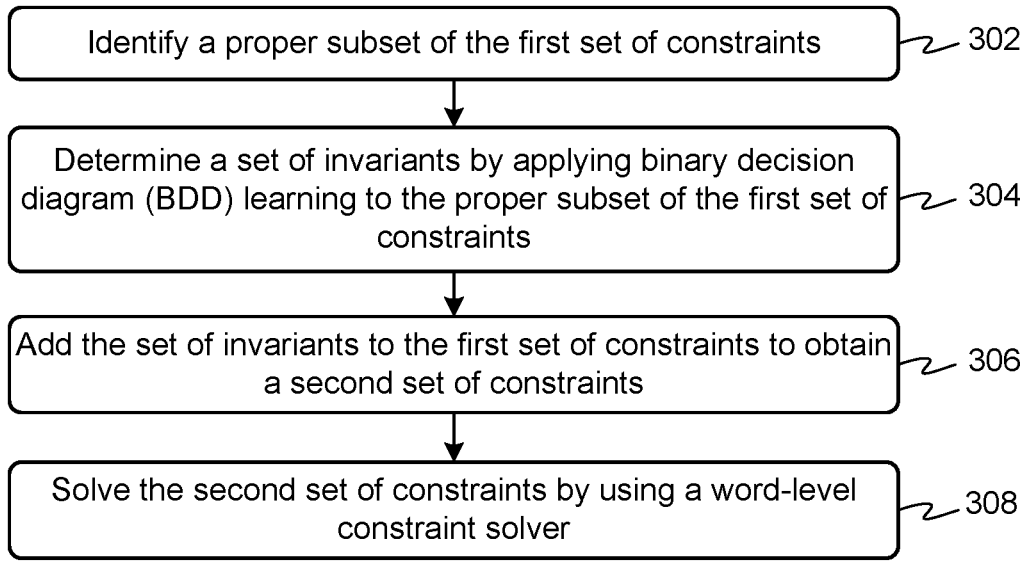
FIG. 3 illustrates a process for determining invariants by using BDD learning in accordance with some embodiments described herein.

Suppose we are given a first set of constraints for an IC design (e.g., the first set of constraints are to be used for generating valid input vectors for verifying the IC design), wherein each constraint can be an expression that is defined over a set of variables used in a description of the IC design. FIG. 3 illustrates a process for determining invariants by using BDD learning in accordance with some embodiments described herein. The process can begin by identifying a proper subset of the first set of constraints (step 302). Note that the proper subset of the first set of constraints does not include at least one constraint in the first set of constraints. Next, the process can determine a set of bit-level invariants by applying BDD learning to the proper subset of the first set of constraints (step 304). The process can then add the set of bit-level invariants to the first set of constraints to obtain a second set of constraints (step 306). Next, the process can solve the second set of constraints by using a word-level constraint solver (step 308), wherein solving the second set of constraints comprises determining value assignments that satisfy a conjunction of the first set of constraints and the set of bit-level invariants. Note that the solutions to the second set of constraints will necessarily satisfy the first set of constraints because the second set of constraints include the first set of constraints. The following sections describe different techniques for determining invariants, which can be performed during step 304.

Use of Forbidden Invariants

In some embodiments disclosed herein, a new, crucial invariant, called the "forbidden" invariant, is used. The general format of a forbidden invariant is as follows:

FORBIDDEN: (cons, var, value, high, low) var[high: low] !=value

Unlike the invariants learned from the on-set (i.e., the solution space) of each constraint, the forbidden invariant can be learned from the off-set (i.e., the negation of the solution space). One key observation is that, in the presence of "CONSTANT" invariants, forbidden invariants can be found after co-factoring with respect to a constant variable. Here is an example of determining a forbidden invariant for the constraint F=a(b'+c'):

F=a(b'+c')->CONSTANT a==1
F'=a'+bc->No invariant found
(F_a)'=(b'+c')'=bc->FORBIDDEN bc !=11

As shown above, we can learn CONSTANT "a==1" from F, however there is nothing to learn from F'. However, once we cofactor F with respect to 'a=1' (i.e., perform co-factoring with respect to a constant variable, since 'a' appears only as positive literals), a forbidden invariant "bc !=11" can be learned from (Fa)'=bc. In other words, some embodiments are able to learn the forbidden invariant "bc!=11." The forbidden invariant is a new type of invariant that is not used in existing BDD learning techniques. Using such forbidden invariants speeds up the constraint solving process for the original set of constraints, e.g., constraint "F=a(b'+c')."

Figure 4:
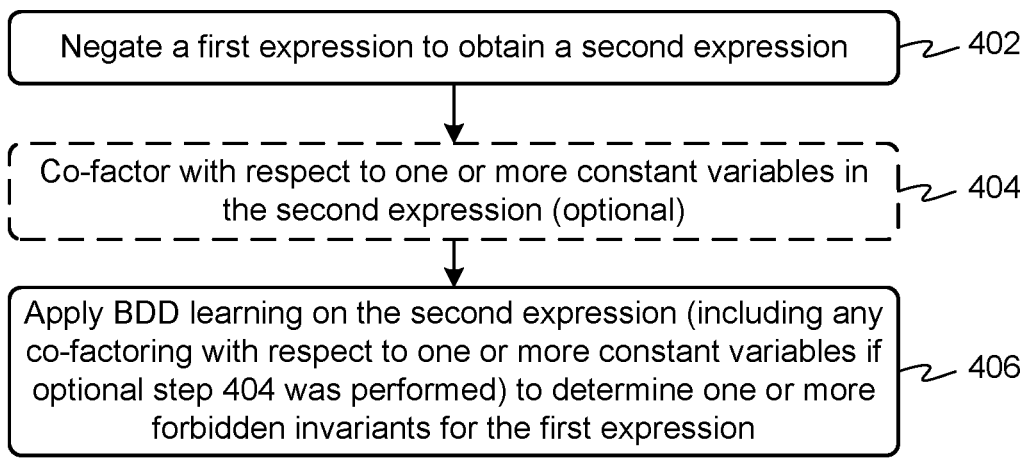
FIG. 4 illustrates a process for determining forbidden invariants by using BDD learning in accordance with some embodiments described herein.

FIG. 4 illustrates a process for determining forbidden invariants by using BDD learning in accordance with some embodiments described herein. These forbidden invariants can be one type of invariant that is determined in step 304 of FIG. 3. The process can begin by negating a first expression to obtain a second expression (step 402). Next, the process can optionally co-factor with respect to one or more constant variables in the second expression (step 404). The process can then apply BDD learning on the second expression (including any co-factoring with respect to a constant variable if optional step 404 was performed) to determine one or more forbidden invariants for the first expression (step 406).

Conditional Learning and Conditional Invariants
Consider the following implied constraint:
a==1->(((x+15) ^x) & 32'h1000) !=0.

Note that no invariants from the above implied constraint can be learned because the guard condition blocks finding any invariants. However, invariants from the right-hand-side (RHS) of the original constraint can be learned, and this process is called "conditional learning." The invariants derived from conditional learning are called "conditional invariants," and they can be used conditionally in a word-level constraint solver by applying the invariants only when the guard condition is satisfied.

Existing BDD learning approaches do not learn any invariants from implied constraints. Some embodiments described herein determine conditional invariants by applying BDD learning to the RHS of implied constraints. Next, the conditional invariants are used by the word-level constraint solver when the left-hand-side (LHS) of the implied constraint is true.

Figure 5:
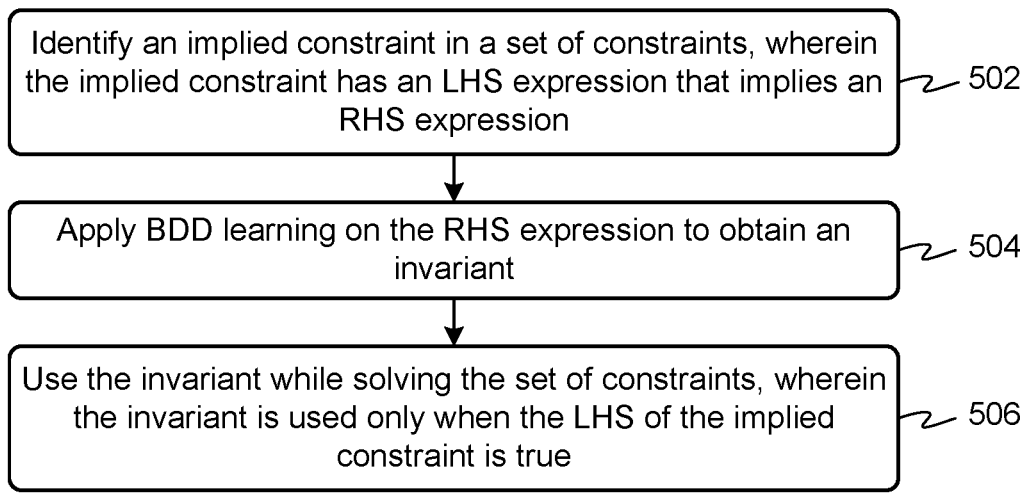
FIG. 5 illustrates a process for determining conditional invariants by using BDD learning in accordance with some embodiments described herein.

FIG. 5 illustrates a process for determining conditional invariants by using BDD learning in accordance with some embodiments described herein. The process can begin by identifying an implied constraint in a set of constraints, wherein the implied constraint has an LHS expression that implies an RHS expression (step 502). Next, the process can apply BDD learning on the RHS expression to obtain an invariant (step 504). The process can then use the invariant while solving the set of constraints, wherein the invariant is used only when the LHS of the implied constraint is true (step 506).

Handling Duplicate Constraints
There can be many duplicate constraints with conditional learning with many different guard conditions. For example, consider the following three constraints:
a==1->(((x+15) ^x) & 32'h1000) !=0
b==1->(((x+15) ^x) & 32'h1000) !=0
c==1->(((x+15) ^x) & 32'h1000) !=0.

In the above example, the RHS expressions of the three constraints are the same. In such cases, invariants can be learned only from one representative constraint, and have the results shared with the other constraints. This avoids the same learning on a same expression from multiple constraints, which also saves memory by sharing the invariants with the other constraints.

Figure 6:
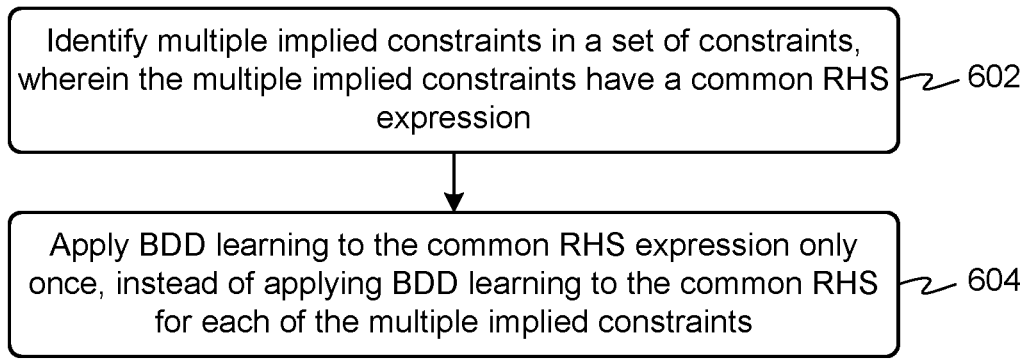
FIG. 6 illustrates a process for determining conditional invariants by using BDD learning when multiple implied constraints have the same right-hand-side (RHS) expression in accordance with some embodiments described herein.

FIG. 6 illustrates a process for determining conditional invariants by using BDD learning when multiple implied constraints have the same RHS expression in accordance with some embodiments described herein. The process can begin by identifying multiple implied constraints in a set of constraints, wherein the multiple implied constraints have a common RHS expression (step 602). Next, the process can apply BDD learning to the common RHS expression only once, instead of applying BDD learning to the common RHS for each of the multiple implied constraints (step 604).

Determining Invariants by Using Initial Value Ranges for Variables

Consider the following constraint where "size" is a random variable:
(((x+size) ^x) & 32'h1000) !=0.

No invariants can be determined for the above constraint. However, in practice, the value range of the variable "size" is either a constant or a small range in many cases. The word-level solver already has initial value ranges of all random variables by constant propagations and implications. Even though the initial value ranges are over-approximate values, they can still can be used for BDD learning. Thus, some embodiments described herein modify the original constraint as follows if the word-level constraint solver has determined that the variable "size" is equal to the value "CONSTANT":
((((x+size) ^x) & 32'h1000) !=0) && (size==CONSTANT)

If the word-level constraint solver determines that the variable "size" is between a minimum value "MIN" and a maximum value "MAX," then the original constraint can be modified as follows:
((((x+size) ^x) & 32'h1000) !=0) && (size>=MIN) && (size<=MAX)

Next, BDD learning can be performed on the modified constraint, while still determining good bit-level invariants. Note that, in this approach, it is possible that many redundant invariants will arise from the range expressions. To avoid those redundant invariants, all invariants from the range expressions are determined and stored. Then, when the BDD invariants from each modified constraint are found, only those BDD invariants that don't already exist in the stored invariants are used. Formally, E_cons: constraint expression to learn
E_range: range expression from initial value ranges
I_range: invariants from BDD_Learn(E_range)
I_cons: invariants from BDD_Learn(E_cons && E_range)
I_learn={I_cons \I_range}
I_learn is the invariants to be used in word-level solver.

Figure 7:
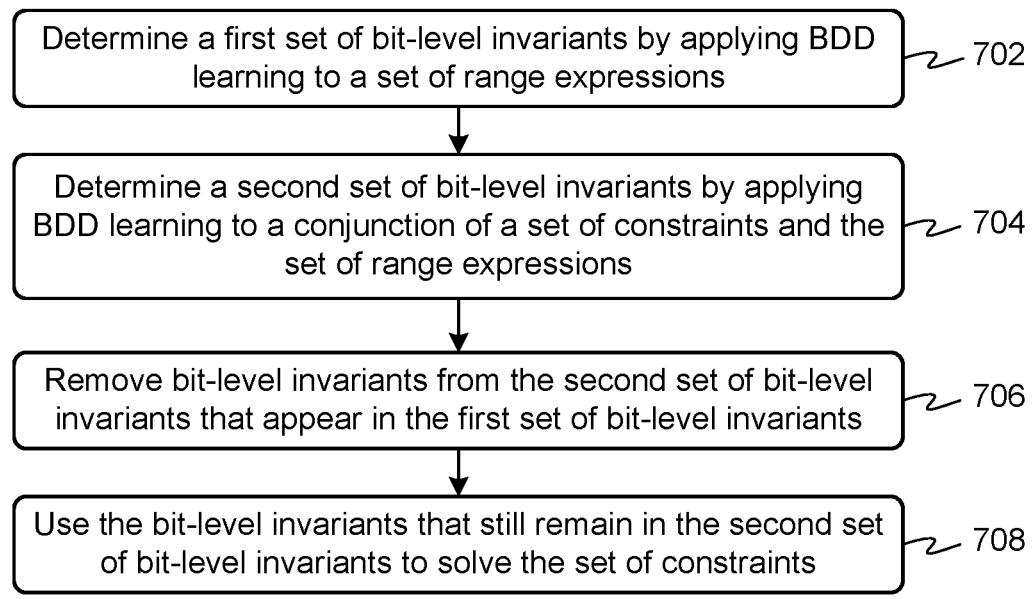
FIG. 7 illustrates a process for determining invariants by using BDD learning in accordance with some embodiments described herein.

FIG. 7 illustrates a process for determining invariants by using BDD learning in accordance with some embodiments described herein. The process can begin by determining a first set of bit-level invariants by applying BDD learning to a set of range expressions (step 702). Next, the process can determine a second set of bit-level invariants by applying BDD learning to a conjunction of a set of constraints and the set of range expressions (step 704). The process can then remove bit-level invariants from the second set of bit-level invariants that appear in the first set of bit-level invariants (step 706). Next, the process can then use the bit-level invariants that still remain in the second set of bit-level invariants to solve the set of constraints (step 708).

IC Design System

Figure 8:
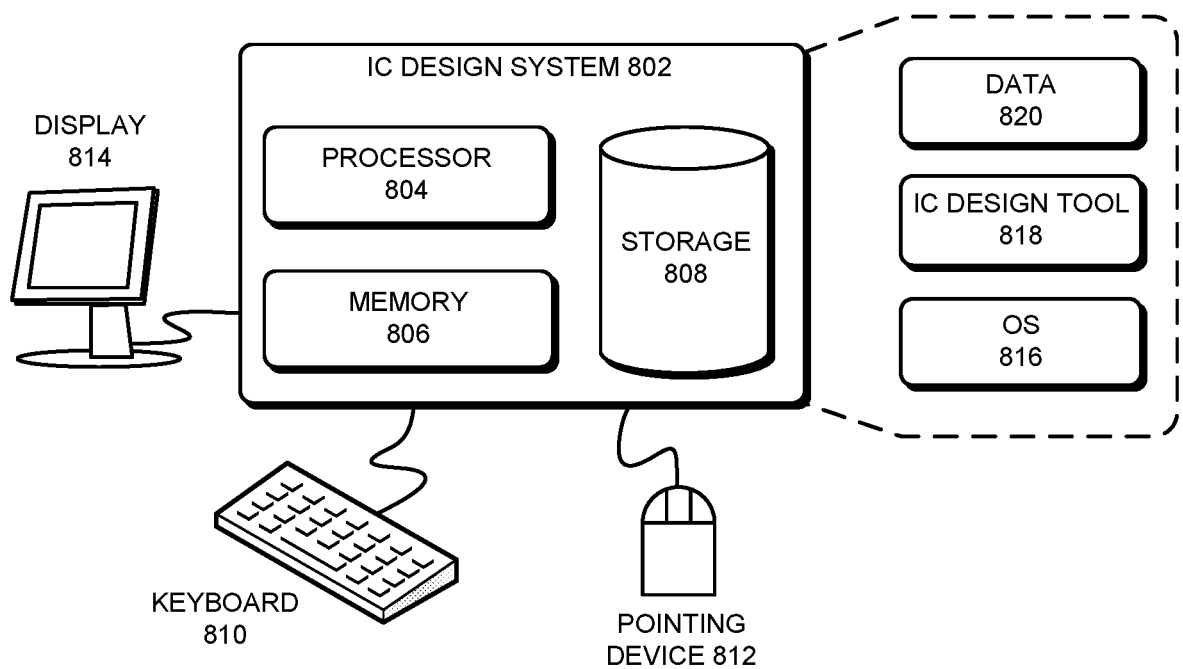
FIG. 8 illustrates an IC design system in accordance with some embodiments described herein.

The term "IC design system" generally refers to a hardware-based system that facilitates the design and manufacture of ICs. FIG. 8 illustrates an IC design system in accordance with some embodiments described herein. IC design system 802 can include processor 804, memory 806, and storage device 808. Specifically, memory locations in memory 806 can be addressable by processor 804, thereby enabling processor 804 to access (e.g., via load/store instructions) and manipulate (e.g., via logical/floating point/arithmetic instructions) the data stored in memory 806. IC design system 802 can be coupled to display device 814, keyboard 810, and pointing device 812. Storage device 808 can store operating system 816, IC design tool 818, and data 820. Data 820 can include input required by IC design tool 818 and/or output generated by IC design tool 818.

IC design system 802 may automatically (or with user help) perform one or more operations that are implicitly or explicitly described in this disclosure. Specifically, IC design system 802 can load IC design tool 818 into memory 806, and IC design tool 818 can then be used to solve a set of constraints during a design and verification flow of the IC design. When the synthesized IC design is manufactured, the resulting IC chips contain the IC design which was verified by using techniques and systems described herein.

Some embodiments described herein can substantially speed up constraint solving. The following table shows the time in seconds it took a word-level constraint solver to solve a set of constraints for various IC designs.

| Design | Current | BDD Learning |
| --- | --- | --- |
| Design1 | 62 | 28 |
| Design2 | timed-out | 60 |
| Design3 | timed-out | 35 |
| Design4 | timed-out | 742 |
| Design5 | timed-out | 1379 |

The column "Design" shows the IC design for which the set of constraints were created. The column "Current" shows the amount of time it took a word-level constraint solver to solve the constraints without using the techniques and systems described herein. If the column shows "timed-out," it means that the word-level constraint solver was unable to solve the constraints in the allotted time (which is typically a very large amount of time). The column "BDD Learning" shows the amount of time it took the word-level constraint solver to solve the constraints when a set of invariants were determined by using the techniques and systems described herein, and the set of invariants were used by the word-level constraint solver to solve the constraints. Note that in many instances, the word-level constraint solver was unable to solve the set of constraints in the allotted time if a set of invariants were not determined by using techniques and systems described herein. In other words, there are multiple instances where the embodiments described herein can enable a computer to perform tasks (e.g., solving constraints for "Design2" in the above-mentioned table) that the computer was unable to do before.

The above description is presented to enable any person skilled in the art to make and use the embodiments. Various modifications to the disclosed embodiments will be readily apparent to those skilled in the art, and the general principles defined herein are applicable to other embodiments and applications without departing from the spirit and scope of the present disclosure. Thus, the present invention is not limited to the embodiments shown, but is to be accorded the widest scope consistent with the principles and features disclosed herein.

The data structures and code described in this disclosure can be partially or fully stored on a computer-readable storage medium and/or a hardware module and/or hardware apparatus. A computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed.

The methods and processes described in this disclosure can be partially or fully embodied as code and/or data stored in a computer-readable storage medium or device, so that when a computer system reads and executes the code and/or data, the computer system performs the associated methods and processes. The methods and processes can also be partially or fully embodied in hardware modules or apparatuses, so that when the hardware modules or apparatuses are activated, they perform the associated methods and processes. Note that the methods and processes can be embodied using a combination of code, data, and hardware modules or apparatuses.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A non-transitory computer-readable storage medium storing instructions, which when executed by a processor, cause the processor to:
   identify a proper subset of a first set of constraints;
   determine a set of bit-level invariants by applying binary decision diagram (BDD) learning to the proper subset of the first set of constraints, wherein the set of bit-level invariants includes at least one forbidden invariant which is determined by applying BDD learning to a negation of a constraint in the proper subset of the first set of constraints;
   add the set of bit-level invariants to the first set of constraints to obtain a second set of constraints;
   solve the second set of constraints by using a word-level constraint solver; and
   verify an integrated circuit (IC) design by using a solution to the second set of constraints.

2. The non-transitory computer-readable storage medium of claim 1, wherein each constraint in the first set of constraints and the second set of constraints is an expression that is defined over a set of variables used in a description of the IC design.

3. The non-transitory computer-readable storage medium of claim 1, wherein solving the second set of constraints comprises determining value assignments that satisfy a conjunction of the first set of constraints and the set of bit-level invariants.

4. The non-transitory computer-readable storage medium of claim 1, wherein the set of bit-level invariants includes at least one conditional invariant.

5. The non-transitory computer-readable storage medium of claim 1, wherein the proper subset of the first set of constraints includes multiple implied constraints with a common right-hand-side (RHS) expression, and wherein said applying BDD learning to the proper subset of the first set of constraints comprises applying BDD learning to the common RHS expression only once.

6. The non-transitory computer-readable storage medium of claim 1, wherein said determining the set of bit-level invariants comprises:
   determining a first set of bit-level invariants by applying BDD learning to a set of range expressions;
   determining a second set of bit-level invariants by applying BDD learning to a conjunction of the proper subset of the first set of constraints and the set of range expressions; and
   removing bit-level invariants from the second set of bit-level invariants that appear in the first set of bit-level invariants.

7. An apparatus, comprising:
   a processor; and
   a non-transitory computer-readable storage medium storing instructions, which when executed by the processor, cause the processor to:
      identify a proper subset of the first set of constraints;
      determine a set of bit-level invariants by applying binary decision diagram (BDD) learning to the proper subset of the first set of constraints, wherein the proper subset of the first set of constraints includes multiple implied constraints with a common right-hand-side (RHS) expression, and wherein said applying BDD learning to the proper subset of the first set of constraints comprises applying BDD learning to the common RHS expression only once;
      add the set of bit-level invariants to the first set of constraints to obtain a second set of constraints;
      solve the second set of constraints by using a word-level constraint solver; and
      verify an integrated circuit (IC) design by using a solution to the second set of constraints.

8. The apparatus of claim 7, wherein each constraint in the first set of constraints and the second set of constraints is an expression that is defined over a set of variables used in a description of the IC design.

9. The apparatus of claim 7, wherein solving the second set of constraints comprises determining value assignments that satisfy a conjunction of the first set of constraints and the set of bit-level invariants.

10. The apparatus of claim 7, wherein the set of bit-level invariants includes at least one forbidden invariant.

11. The apparatus of claim 7, wherein the set of bit-level invariants includes at least one conditional invariant.

12. The apparatus of claim 7, wherein said determining the set of bit-level invariants comprises:
   determining a first set of bit-level invariants by applying BDD learning to a set of range expressions;
   determining a second set of bit-level invariants by applying BDD learning to a conjunction of the proper subset of the first set of constraints and the set of range expressions; and
   removing bit-level invariants from the second set of bit-level invariants that appear in the first set of bit-level invariants.

13. A method, comprising:
   identifying a proper subset of a first set of constraints;
   determining a set of bit-level invariants by applying binary decision diagram (BDD) learning to the proper subset of the first set of constraints, wherein said determining the set of bit-level invariants comprises:
      determining a first set of bit-level invariants by applying BDD learning to a set of range expressions;
      determining a second set of bit-level invariants by applying BDD learning to a conjunction of the proper subset of the first set of constraints and the set of range expressions; and
      removing bit-level invariants from the second set of bit-level invariants that appear in the first set of bit-level invariants;
   adding the set of bit-level invariants to the first set of constraints to obtain a second set of constraints;
   solving the second set of constraints by using a word-level constraint solver;
   verifying, by a processor, an integrated circuit (IC) design by using a solution to the second set of constraints.

14. The method of claim 13, wherein each constraint in the first set of constraints and the second set of constraints is an expression that is defined over a set of variables used in a description of the IC design.

15. The method of claim 13, wherein solving the second set of constraints comprises determining value assignments that satisfy a conjunction of the first set of constraints and the set of bit-level invariants.

16. The method of claim 13, wherein the set of bit-level invariants includes at least one forbidden invariant.

17. The method of claim 13, wherein the set of bit-level invariants includes at least one conditional invariant.

* * * * *